United States Patent
Hofmann et al.

(10) Patent No.: US 9,328,767 B2
(45) Date of Patent: May 3, 2016

(54) BEARING ASSEMBLY

(71) Applicants: Katrin Hofmann, Wiesenbronn (DE);
Jochen Kuhstrebe, Biebelried (DE);
Armin Olschewski, Schweinfurt (DE);
Arno Stubenrauch, Aidhausen (DE);
Malinipriya Thangavelu, Schweinfurt (DE)

(72) Inventors: Katrin Hofmann, Wiesenbronn (DE);
Jochen Kuhstrebe, Biebelried (DE);
Armin Olschewski, Schweinfurt (DE);
Arno Stubenrauch, Aidhausen (DE);
Malinipriya Thangavelu, Schweinfurt (DE)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 14/520,782

(22) Filed: Oct. 22, 2014

(65) Prior Publication Data
US 2015/0139584 A1  May 21, 2015

(30) Foreign Application Priority Data

Oct. 24, 2013 (DE) .......................... 10 2013 221 602

(51) Int. Cl.
| | |
|---|---|
| *F16C 19/54* | (2006.01) |
| *F16C 19/52* | (2006.01) |
| *F16C 33/58* | (2006.01) |
| *F16C 33/66* | (2006.01) |
| *F16C 35/06* | (2006.01) |
| *F03D 11/00* | (2006.01) |
| *F16C 33/36* | (2006.01) |
| *F16C 19/36* | (2006.01) |
| *F16C 19/38* | (2006.01) |

(52) U.S. Cl.
CPC .......... *F16C 19/542* (2013.01); *F03D 11/0008* (2013.01); *F16C 19/364* (2013.01); *F16C 19/386* (2013.01); *F16C 19/543* (2013.01); *F16C 33/366* (2013.01); *F16C 33/586* (2013.01)

(58) Field of Classification Search
CPC ............ F16C 19/385; F16C 2019/365; F16C 2019/368; F16C 33/60; F16C 33/605; F16C 33/585; F16C 33/586; F16C 2360/31
USPC ......... 384/548, 549, 564–565, 559, 571, 585, 384/622–623, 539, 562, 462
See application file for complete search history.

(56) References Cited

U.S. PATENT DOCUMENTS

| | | | |
|---|---|---|---|
| 1,104,363 A | | 7/1914 | Lockwood |
| 1,966,923 A | * | 7/1934 | Couch .......................... 384/459 |
| 3,850,485 A | * | 11/1974 | Zimmer et al. ............... 384/558 |

(Continued)

FOREIGN PATENT DOCUMENTS

| | | |
|---|---|---|
| DE | 923631 | 2/1955 |
| DE | 102010040748 A1 | 3/2012 |
| DE | 102011118137 A1 | 5/2013 |
| EP | 1348879 A1 | 10/2003 |
| EP | 2664808 A2 | 11/2013 |

(Continued)

*Primary Examiner* — Marcus Charles
(74) *Attorney, Agent, or Firm* — Bryan Peckjian; SKF USA Inc. Patent Dept.

(57) ABSTRACT

A bearing assembly includes first and second rolling-element bearings each having an inner ring with a running surface for rolling elements and a guide flange that extends radially outwardly beyond the running surface for limiting axial movement of the rolling elements. The inner rings are configured such that they are in contact with each other exclusively within a contact surface diameter that is smaller than an average value of a maximum diameter of the running surface of one of the inner rings and a maximum outer diameter of that inner ring. The guide flanges are disposed on sides of the inner ring of the first rolling-element bearing and of the second rolling-element bearing that face each other axially.

14 Claims, 5 Drawing Sheets

(56) References Cited

U.S. PATENT DOCUMENTS

| | | | | |
|---|---|---|---|---|
| 5,362,159 A | * | 11/1994 | Kufner et al. | 384/571 |
| 5,632,560 A | * | 5/1997 | Dittenhofer | 384/447 |
| 6,293,704 B1 | * | 9/2001 | Gradu | 384/564 |
| 6,513,982 B2 | * | 2/2003 | Boyd et al. | 384/475 |
| 8,075,196 B2 | * | 12/2011 | Burner et al. | 384/571 |
| 8,535,009 B2 | * | 9/2013 | Hofmann | 384/567 |
| 2010/0308594 A1 | * | 12/2010 | Numajiri | 290/55 |
| 2012/0321237 A1 | | 12/2012 | Usuki et al. | |

FOREIGN PATENT DOCUMENTS

| | | | | |
|---|---|---|---|---|
| FR | 992298 A | | 10/1951 | |
| GB | 341363 A | | 1/1931 | |
| GB | 1254418 A | | 11/1971 | |
| GB | 2168115 A | | 6/1986 | |
| JP | 2003156055 A | * | 5/2003 | F16C 33/60 |
| JP | 2004011715 A | * | 1/2004 | F16C 33/66 |
| JP | 2004084938 | * | 3/2004 | F16C 33/58 |
| JP | 2009052578 A | | 3/2009 | |

* cited by examiner

BEARING ASSEMBLY

CROSS-REFERENCE

This application claims priority to German patent application no. 10 2013 221 602.5 filed on Oct. 24, 2013, the contents of which are fully incorporated herein by reference.

TECHNOLOGICAL FIELD

Exemplary embodiments are directed to bearing or supporting rotatable shafts and in particular to a bearing assembly or assemblies for supporting a rotatable shaft.

BACKGROUND

Loads on a rotating shaft can deform the shaft and affect the way the shaft rotates in the one or more bearing assemblies that support the shaft. FIG. 3a shows an example of an unloaded shaft 320 which is supported by two bearing assemblies 310. FIG. 3b, shows the shaft 320 bending away from an unloaded state 302 due to the presence of a central load 304 (the load need not be centered; off-center loads will also bend the shaft). Rotating masses 330 at the ends of the shaft, with or without an additional center load 304, will cause the shaft to bend in still another manner when it rotates. This rotating bending of the shaft 320 due to the rotating masses 330 and the resulting shaft-pin rotating bending at the ends of the shaft is shown in FIG. 3c.

Shaft deformations can produce deformations inside the bearing assemblies, and this in turn can increase wear and consequently lead to a shorter bearing service life.

SUMMARY

There is therefore a need to provide a bearing assembly that reduces wear and/or increases bearing service life.

Some exemplary embodiments relate to a bearing assembly that includes a first rolling-element bearing and a second rolling-element bearing. The first rolling-element bearing comprises an inner ring which is connectable to a shaft for rotation therewith. The inner ring of the first rolling-element bearing has a running surface for rolling elements of the first rolling-element bearing. The second rolling-element bearing comprises an inner ring which is also connectable to the shaft for rotation therewith. The inner ring of the second rolling-element bearing has a running surface for rolling elements of the second rolling-element bearing. The inner ring of the first rolling-element bearing and the inner ring of the second rolling-element bearing are formed such that they are in contact with each other exclusively within a contact surface diameter, and the contact surface diameter is smaller than an average value of a maximum diameter of the running surface of the inner ring of the first rolling-element bearing and a maximum outer diameter of the inner ring of the first rolling-element bearing. The contact surface diameter is also smaller than an average value of a maximum diameter of the running surface of the inner ring of the second rolling-element bearing and a maximum outer diameter of the inner ring of the second rolling-element bearing. The inner ring of the first rolling-element bearing and the inner ring of the second rolling-element bearing are disposed directly adjacent to each other.

Providing a gap between the inner rings of the rolling-element bearing helps prevent the inner ring from being deformed towards the rolling elements when the shaft deforms. It also avoids changing the contact geometry/rolling contact when the shaft is deformed. When the inner ring deforms, wear on the flange increases and bearing service life can decrease. The gap provides a spacing between the guide flanges of the inner rings so that when the bearing assembly deforms, the guide flanges no longer press against each other (or at least they press against each other less). In this way wear can be kept low and the bearing service life can be increased.

Some exemplary embodiments relate to a bearing assembly in which the two rolling-element bearings are tapered roller bearings in an X-arrangement. This allows such a bearing assembly having a long service life to be implemented economically.

BRIEF DESCRIPTION OF THE DRAWINGS

Exemplary embodiments are explained in more detail below with reference to the accompanying Figures.

DETAILED DESCRIPTION

Figure 1:
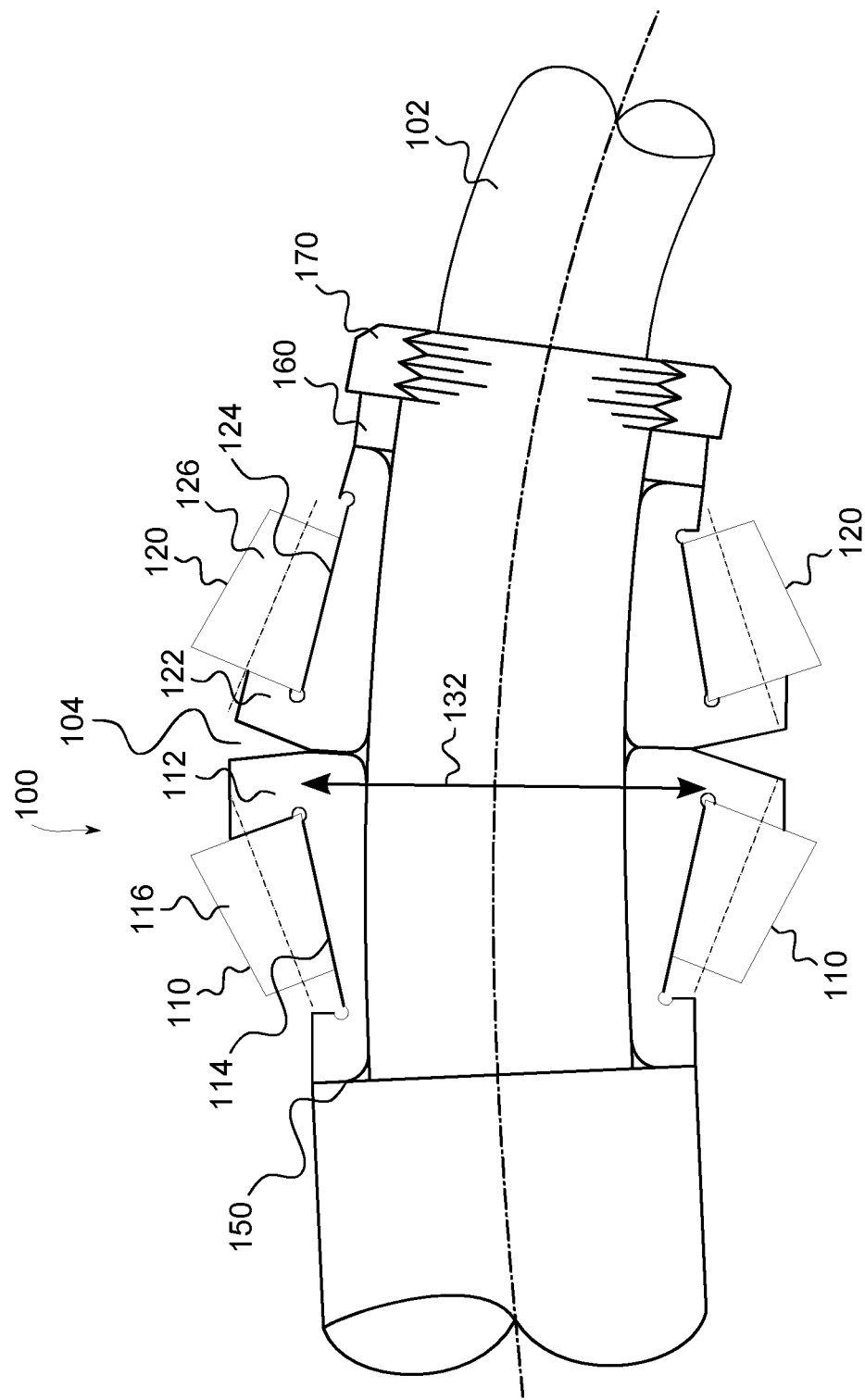
FIG. 1 is a schematic side elevational view of a bearing assembly according to an embodiment of the present disclosure.

In the following discussion, the same reference numerals are sometimes used with various described exemplary embodiments for objects and functional units that have the same or similar functional properties. Furthermore, summarizing reference numerals may be used for components and objects that appear multiple times in an exemplary embodiment or in an illustration, but that are described together in terms of one or more common features. Components or objects that are described with the same or summarizing reference numerals can be embodied identically, but also optionally differently, in terms of individual, multiple, or all features, for example their dimensions, as long as the description does not explicitly or implicitly indicate otherwise. Furthermore, optional features of the different exemplary embodiments may be combinable or interchangeable with one another.

FIG. 1 schematically illustrates a bearing assembly 100 according to an exemplary embodiment. The bearing assembly 100 includes a first rolling-element bearing 110 and a second rolling-element bearing 120. The first rolling-element bearing 110 comprises an inner ring 112 that is connectable to a shaft 102 for rotation therewith. The inner ring 112 of the first rolling-element bearing 110 has a running surface 114 for rolling elements 116 of the first rolling-element bearing 110. The second rolling-element bearing 120 includes an inner ring 122 that is also connectable to the shaft 102 for rotation therewith. The inner ring 122 of the second rolling-element bearing 120 has a running surface 124 for rolling elements 126 of the second rolling-element bearing 120.

The inner ring 112 of the rolling-element bearing 110 and the inner ring 122 of the second rolling-element bearing 120 are formed such they are in contact with each other exclusively within a contact surface diameter 132. This contact surface diameter 132 is smaller than an average value of a maximum diameter of the running surface 114 of the inner ring 112 of the first rolling-element bearing 110 and a maximum outer diameter of the inner ring 112 of the first rolling-element bearing 120. The contact surface diameter 132 is also smaller than an average value of a maximum diameter of the running surface 124 of the inner ring 122 of the second rolling-element bearing 120 and a maximum outer diameter of the inner ring 122 of the second rolling-element bearing 120. The foregoing presupposes that the inner ring 112 of the first rolling-element bearing 110 and the inner ring 122 of the second rolling-element bearing 120 are disposed directly adjacent to each other (e.g. on a shaft).

The inner rings of the rolling-element bearing are formed so that a gap exists between the guide flanges of the inner rings. Therefore, when the shaft 102 is deformed, the inner rings do not press against each other and are not deformed and also do not press against the rolling elements, or in the alternative, the inner rings press against each other less, and are deformed less, and press against the rolling elements less. In this way wear can be significantly reduced and bearing service life significantly increased.

The bearing assembly 100 can include two (the first and the second) rolling-element bearings or more rolling-element bearings. In some embodiments, only the inner rings of the first and second rolling-element bearings are designed to have a gap 104 between their guide flanges. Alternately gaps can also formed between all or between some further inner rings of the rolling-element bearings.

The first rolling-element bearing 110 and the second rolling-element bearing 120 may include, for example, in addition to the inner ring and the rolling elements, at least one outer ring, and the rolling element bearings can be of the same or of different bearing types (e.g. ball bearings, tapered roller bearings, angular contact ball bearings, cylindrical roller bearings, or spherical roller bearings). For example, the first rolling-element bearing 110 and the second rolling-element bearing 120 can be tapered roller bearings which may be arranged in an X-arrangement (e.g., defined by axes of rotation of the rolling elements of a rolling-element bearing which intersect, with respect to this rolling-element bearing, on the axial side facing away from the respective other rolling-element bearing) or an O-arrangement (e.g., defined by axes of rotation of the rolling elements of a rolling-element bearing which intersect, with respect to this rolling-element bearing, on the side facing the respective other rolling-element bearing).

If the first rolling-element bearing 110 and the second rolling-element bearing 120 are of the same bearing type, they can be embodied differently (e.g. due to asymmetric load or difference in available installation space) or constructed symmetrically relative to each other in the axial direction. Symmetrical construction may help keep costs low, since a larger number of identical rolling-element bearings can be implemented.

The inner rings of the rolling-element bearing have a guide flange, at least on one axial side, protruding radially over or beyond the running surface This guide flange may also be referred to as a "bearing flange" or generally as a "flange". Each of the two inner rings also has a running surface along which the rolling elements of the bearing run or roll during operation.

Specifically, in the embodiment of FIG. 1, the inner ring 112 of the first rolling-element bearing 110 has a guide flange which extends radially over or beyond the running surface 114 of the inner ring 112 of the first rolling-element bearing 110 and which axially limits movement of the rolling elements 116 of the first rolling-element bearing 110. The inner ring 122 of the second rolling-element bearing 120 further has a guide flange which extends radially over or beyond the running surface 116 of the inner ring 122 of the second rolling-element bearing 120 and axially limits movement of the rolling elements 126 of the second rolling-element bearing 120. The guide flanges thus form a guide for the rolling elements moving along the running surfaces.

Depending on the bearing type, the running surfaces of the bearing rings may extend parallel to the axis of rotation of the shaft 102 (e.g. in the case of a cylindrical roller bearing), be a section of the surface of a torus (e.g. in the case of ball bearings) or be tilted at a fixed angle with respect to the axis of rotation of the shaft 102 (e.g. in the case of tapered roller bearings). A maximum diameter of the running surface of an inner ring can accordingly be constant along the running surface in the axial direction (e.g., in a cylindrical roller bearing) or vary in the axial direction (e.g., in a ball bearing or in a tapered roller bearing). The maximum diameter then corresponds to that diameter (e.g., radial extent) which is largest along the axial extent of the running surface.

The axial direction extends parallel to the axis of rotation of the (undeformed) shaft 102, and the radial direction extends orthogonal to the axis of rotation of the shaft 102.

The shaft 102 can be any component, which in operation rotates about its axis, of a machine or device in which a bearing assembly 100 according to the described concept is used. The shaft 102 can be connected via the inner rings of the rolling-element bearing for rotation therewith (e.g. such that no relative rotation occurs between the shaft and the inner rings without destruction or damage) and is, for example, not part of the bearing assembly 100. Alternatively the shaft 102 can optionally also be part of the bearing assembly 100.

The inner rings of the two rolling-element bearings of the bearing assembly 100 can be disposed such that they abut one another on a shaft (e.g. without another component between the bearing rings, but disregarding connecting means, such as, e.g., adhesive). The bearing assembly 100 can in this manner be implemented with little axial installation space. Alternately, the inner rings can be connected to each other so that they rotate together (e.g. are adhered) or directly abut on each other without being connected to one another up to, at most, the contact surface extending up to the contact surface diameter 132.

The inner ring 112 of the first rolling-element bearing 110 and the inner ring 122 of the second rolling-element bearing 120 are radially in contact with each other exclusively within a contact surface diameter 132. If the inner rings abut on each other, the contact surface diameter 132 is, for example, an outer diameter (e.g. a maximum or minimum outer diameter) of a contact surface extending substantially radially between the inner rings of the two rolling-element bearings.

The contact surface diameter 132 is smaller than an average value (e.g. an arithmetic average) of a maximum diameter of the running surface 114 of the inner ring 112 and a maximum outer diameter (e.g. greatest extension in the radial direction) of the inner ring 112. The contact surface diameter 132 is also smaller than an average value of a maximum diameter of the running surface 124 of the inner ring 122 and a maximum outer diameter of the inner ring 122. In other words, the contact surfaces can extend radially up to halfway between the maximum diameters of the running surfaces and the maximum outer diameters of the inner rings. It can thereby be ensured that a gap 104 exists between at least parts of the guide flanges of the inner rings so that the guide flanges are able to bend when the shaft deforms without pressing against each other. If the contact surface were to extend radially outward further than up to halfway between the maximum diameters of the running surfaces and the maximum outer diameters of the inner rings this effect would be at least weakened because the one guide flange would more readily press against the other guide flange.

In other words, the inner ring 112 of the first rolling-element bearing 110 and the inner ring 122 of the second rolling-element bearing 120 are formed with an axial gap 104 (or groove) therebetween which gap is outside the contact surface diameter 132 when the inner ring 112 of the first rolling-element bearing 110 and the inner ring 122 of the second rolling-element bearing 120 are disposed so that they directly abut each other.

To provide the axial gap 104 between the two inner rings outside the contact surface diameter 132, at least one of the two inner rings or both of the two inner rings can have, outside the contact surface diameter 132, a lateral surface or a part of a lateral surface that does not extend radially and that is connected to the contact surface.

The contact surface diameter 132 can optionally be smaller than a maximum diameter of the running surface 114 of the inner ring 112 of the first rolling-element bearing 110 and smaller than a maximum diameter of the running surface 124 of the inner ring 122 of the second rolling-element bearing 120. A mutual pressing-together of the guide flanges of the inner rings over the entire radial extension of the guide flanges can thereby be prevented during deforming.

Furthermore, the contact surface diameter 132 can optionally be smaller than a diameter of the running surface at a point or a part of the running surface which lies axially adjacent to the gap 104.

The gap 104 formed by the inner rings of the two rolling-element bearings, which inner rings abut on each other, can have different geometries. For example, the gap 104 can have a constant, average, or maximum axial dimension (e.g. axial extension, axial width, or axial length) that is smaller than a radial dimension of a contact surface between the inner ring 112 of the first rolling-element bearing 110 and the inner ring 122 of the second rolling-element bearing 120. It such case the gap 104 only requires a small amount of axial installation space. In other words, the inner ring 112 of the first rolling-element bearing 110 and the inner ring 122 of the second rolling-element bearing 120 can be formed such that a maximum axial distance between the inner ring 112 of the first rolling-element bearing 110 and the inner ring 122 of the second rolling-element bearing 120 is smaller radially outside the contact surface diameter 132 than a radial dimension of a contact surface between the inner ring 112 of the first rolling-element bearing 110 and the inner ring 122 of the second rolling element bearing 120, if the inner ring 112 of the first rolling-element bearing 110 and the inner ring 122 of the second rolling-element bearing 120 are disposed directly adjacent to each other. Alternatively, the maximum axial distance between the inner ring 112 of the first rolling-element bearing 110 and the inner ring 122 of the second rolling-element bearing 120 radially outside the contact surface diameter 132 can also be smaller, for example, than 10% (or smaller than 5% or smaller than 1%) of the radial dimension of the contact surface between the inner ring 112 of the first rolling-element bearing 110 and the inner ring 122 of the second rolling-element bearing 120.

The exact dimensions of the gap 104 can vary depending on how and where the bearing assembly is used, since the sizes of the rolling-element bearings can vary within wide ranges. For some applications, the gap 104 may have a (maximum) axial dimension of less than 0.5 mm (or less than 0.3 mm, less than 0.2 mm, or less than 0.1 mm), or the axial dimension can fall between 0.5 mm and 0.05 mm (or between 0.2 mm and 0.1 mm). In other words, the inner ring 112 of the first rolling-element bearing 110 and the inner ring 122 of the second rolling-element bearing 120 can be formed such that a maximum axial distance between the inner ring 112 of the first rolling-element bearing 110 and the inner ring 122 of the second rolling-element bearing 120 is smaller than, for example, 0.5 mm outside the contact surface diameter 132 (e.g. between the contact surface diameter and a maximum diameter of a guide flange at least one of the two inner rings), if the inner ring 112 of the first rolling-element bearing 110 and the inner ring 122 of the second rolling-element bearing 120 are disposed directly adjacent to each other.

The gap 104 may, for example, have a V-shaped geometry as shown in FIG. 1. With a V-shape, the weakening due to the gap 104 can be kept low in the region of the base or foot of the flange, at which location the flange has the smallest material thickness. Alternatively, however, the gap 104 can have other geometries (e.g. it may be U-shaped or rectangular). In other words, the inner ring 112 of the first rolling-element bearing 110 and the inner ring 122 of the second rolling-element bearing 120 can be formed such that the inner ring 112 of the first rolling-element bearing 110 and the inner ring 122 of the second rolling-element bearing 120 form a V-shaped, U-shaped, or rectangular gap 104 radially outside the contact surface diameter 132.

In the example shown in FIG. 1, the bearing assembly 100 is optionally disposed on a shaft 102 that includes an axial stop 150. On an end opposite the axial stop 150, the bearing assembly 100 is optionally pressed against the axial stop 150 by a screw or nut 170 via a spacer disk 160 and thus fixed in its position.

Figure 2:
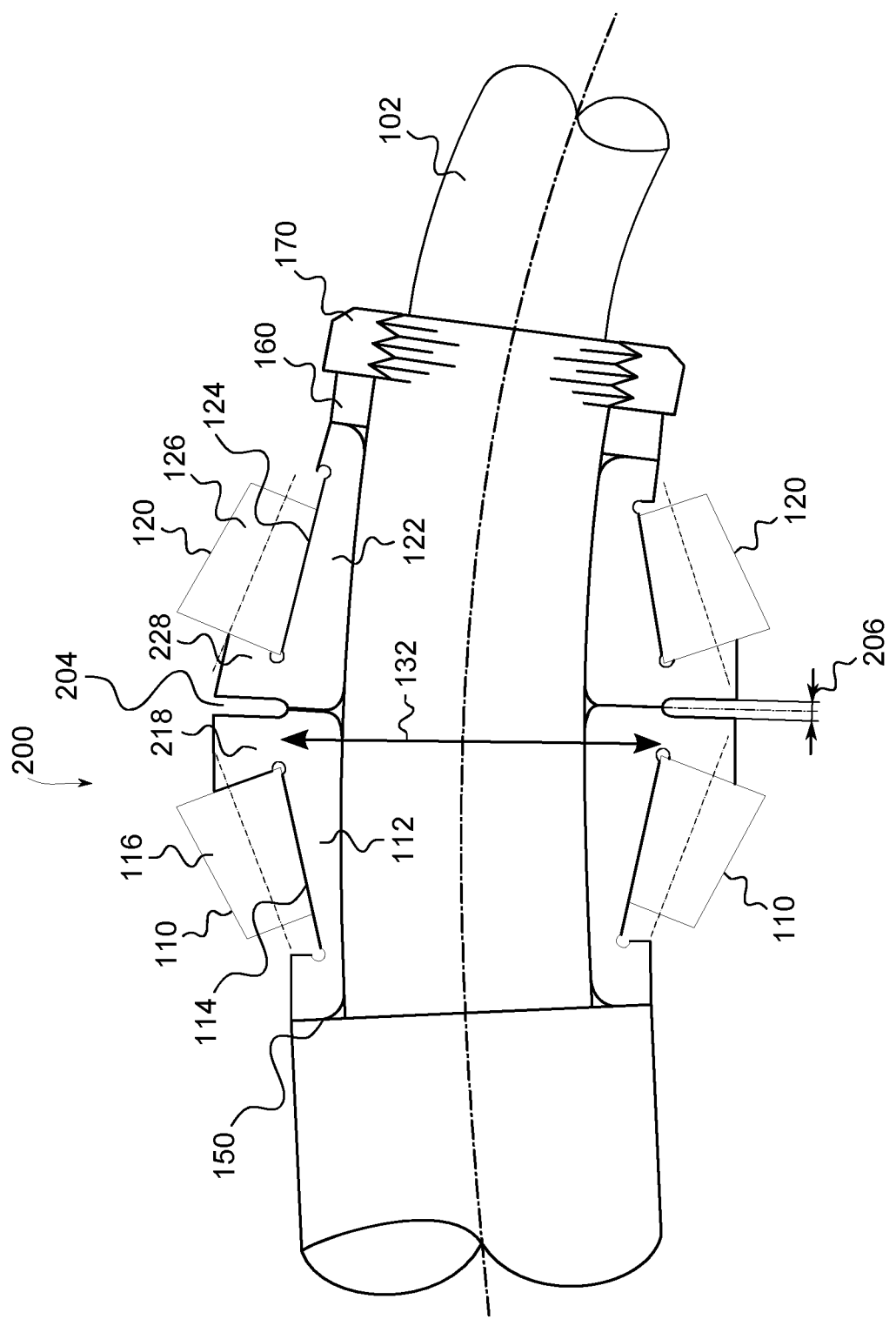
FIG. 2 is a schematic side elevational view of a further bearing assembly.
Figure 3A:
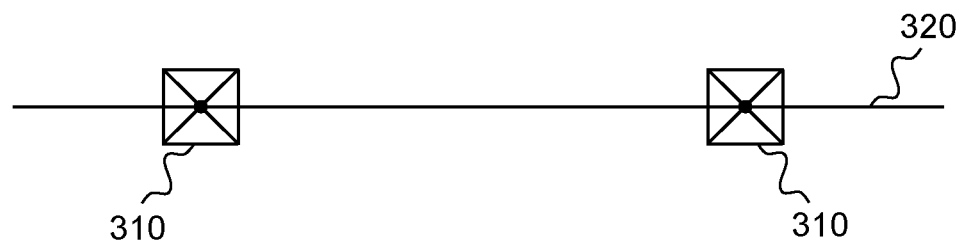
FIG. 3a is a schematic depiction of an unloaded rotatable shaft.
Figure 3B:
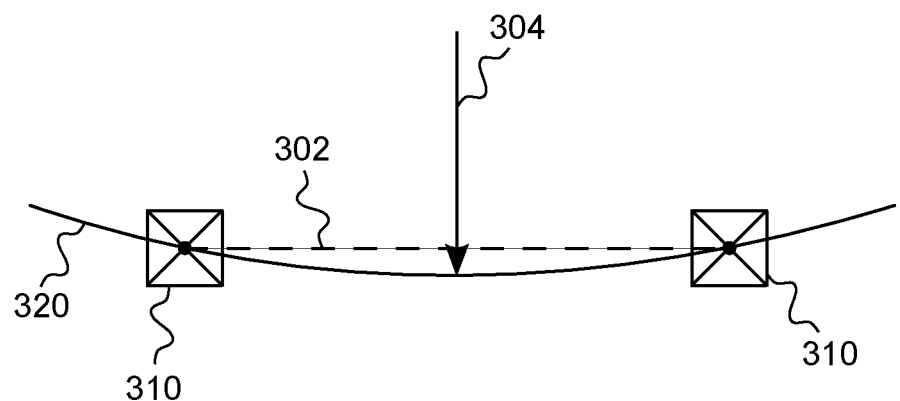
FIG. 3b is a schematic depiction of a center-loaded rotatable shaft.
Figure 3C:
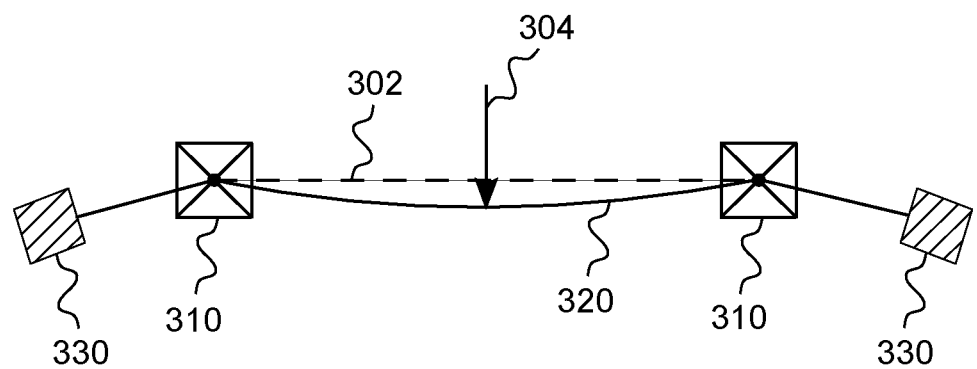
FIG. 3c is a schematic depiction of an end-loaded rotatable shaft.

FIG. 2 shows a schematic illustration of a further bearing assembly 200 according to an exemplary embodiment. The bearing assembly 200 substantially corresponds to the structure of the bearing assembly of FIG. 1, so that accordingly the above description of the previous embodiment applies here as well. The inner rings of the two rolling-element bearings of the bearing assembly 200 are formed such that an axial gap 204 is present between the guide flange 218 of the inner ring 112 of the first rolling-element bearing 110 and the guide flange 228 of the inner ring 122 of the second rolling-element bearing 120. This axial gap 204 provides space for the guide flanges to move (for a deforming of the guide flange) during deformation of the shaft 102. In this case the gap 204 is U-shaped. The gap 204 can, for example, have an axial dimension 206 as is described in the context of FIG. 1.

Some exemplary embodiments relate to a tapered roller bearing assembly in an X-arrangement. In this case a gap can be formed between two tapered roller bearings in an X-arrangement which gap substantially prevents the adjacent flanges of the bearing from pressing against each other when the shaft on which the inner rings sit bends. In other words, a contact, for example, between the guide flanges during deforming of the shaft, can be prevented by the gap. In this way the bearing service life can be increased. The concept described can, for example, be used in wind turbines.

Figure 4:
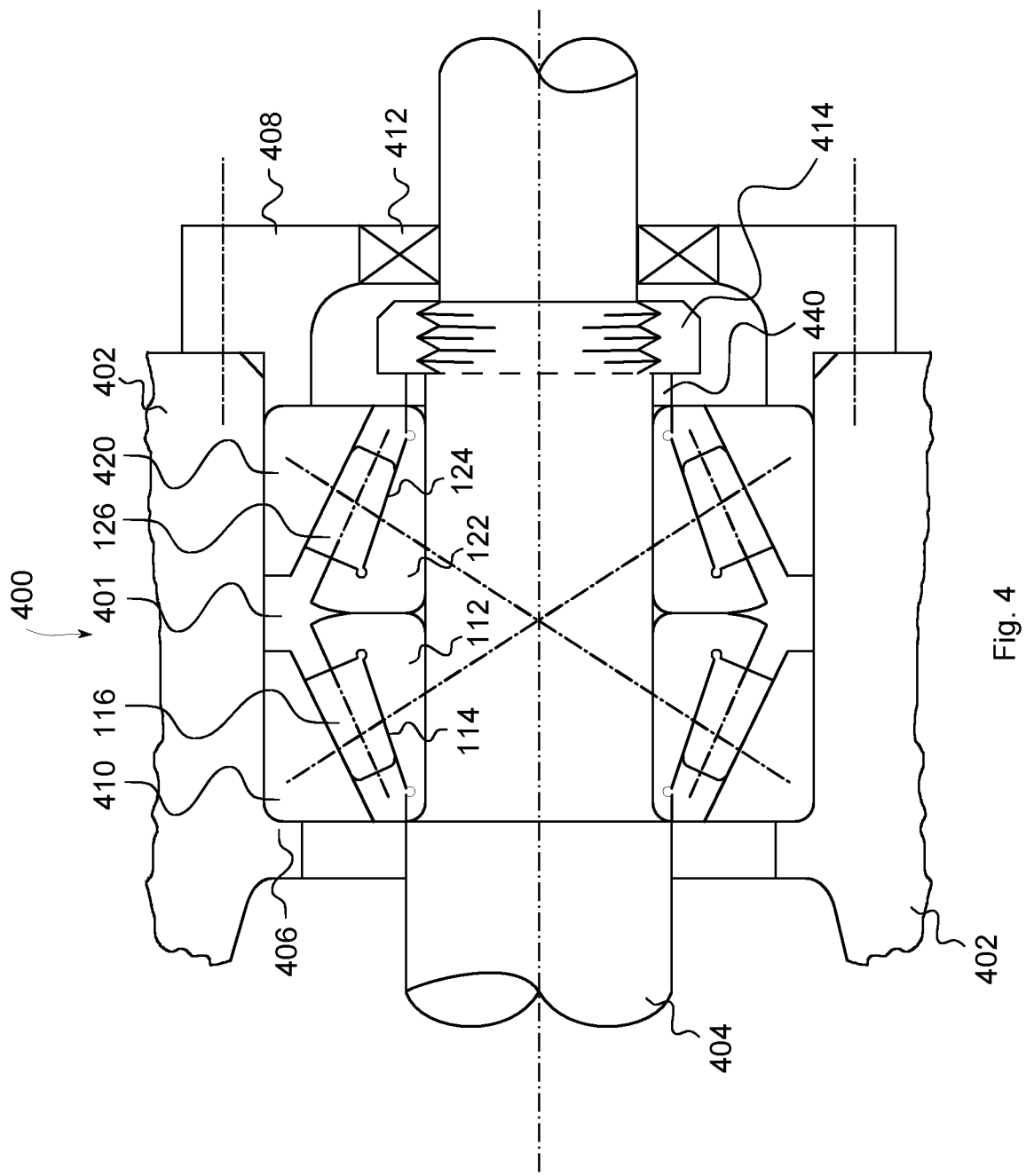
FIG. 4 is a schematic illustration of a tapered roller bearing in an X-arrangement.

FIG. 4 shows a schematic depiction of a bearing assembly 400 including two rolling-element bearings according to an exemplary embodiment. The bearing assembly 400 corresponds substantially to the design of the bearing assembly from FIG. 1 or FIG. 2, so that much of the foregoing descriptions of these embodiments applies here as well. The tapered roller bearings 410, 420 include inner rings 112, 122 which abut each other axially and outer rings (bearing outer rings) connected to a housing 402. Furthermore, the bearings have conical rolling elements 116, 126 (rollers). In this case the tapered roller bearings are arranged on a shaft 404 in an X-arrangement with respect to each other. The inner rings of the tapered roller bearings are disposed between an axial stop of the shaft 404 and a spacer disk 440 for preloading the bearings. The outer rings of the tapered roller bearings are disposed between an attachment flange of the bearing (the housing) 406 and an outer-ring attachment 408. A seal 412 can be disposed between the outer-ring attachment 408 and the shaft. A preload can be applied to the bearing via the spacer disk 440 using a nut 414. For this purpose the shaft 404 can have a thread in the region of the nut 414.

Some exemplary embodiments relate to a wind turbine including a bearing assembly according to the concept described or one of the above-described exemplary embodiments.

Some further exemplary embodiments relate to a method for manufacturing a bearing assembly including a first rolling-element bearing, a second rolling-element bearing, and an intermediate ring according to the above-described concept or one of the exemplary embodiments. For example, a recess can be generated in at least one inner ring of the two rolling-element bearings (or in both inner rings) by grinding, turning, milling or a similar method, so that outside the contact surface diameter a gap is present between the two inner rings when the two inner rings abut on each other.

Some exemplary embodiments relate to an X-arrangement with a V-groove. The inner ring (or the inner rings) can be separate in the region of the flange due to the presence of a recess. The recess can be produced, for example, by grinding, turning, milling, or a similar method. The separation can be implemented on one side or both sides, V-shaped as a groove, or U-shaped. With a V-shape, in the region of the base of the flange, at which location the flange has the smallest material thickness, the weakness caused by the separation is kept small.

Rotating stresses, for example, due to bending of the shaft can be reduced or substantially eliminated in an X-arrangement of tapered roller bearings (TRB) using the concept described herein.

Figure 5:
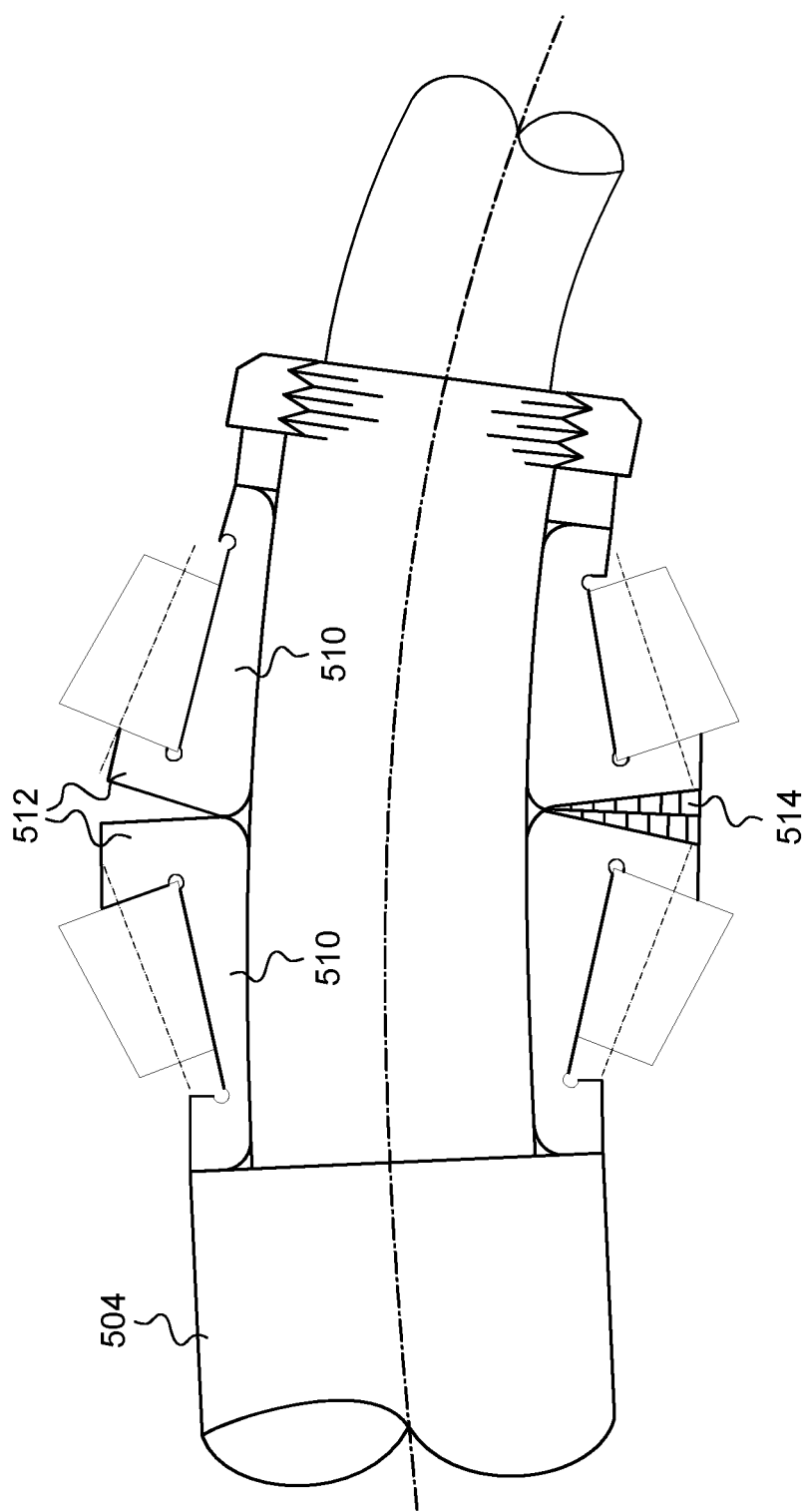
FIG. 5 schematically illustrates a deformed shaft in a bearing assembly without an intermediate ring.

FIG. 5 shows in a greatly exaggerated manner how the bending of a shaft 504 can produce a gap or opening between the inner rings 510 and/or the guide flanges 512 of the inner ring 510 on one side of the shaft 504, and cause the guide flanges on the other side of the shaft 504 to exert pressure 514 on each other. In this manner, the guide flanges 512 can be deformed by shaft bending if no gap is present between the flanges according to the described concept or as in one of the exemplary embodiments. Once conventional guide flanges 512 are deformed, they will tend to exert increased pressure on the rolling elements of the bearing assembly and thus cause increased wear and a reduction of the bearing service life. For example, friction corrosion (wear) can result.

Due to the mutual pressure 514, a plastic deformation of the flange may occur, and this can lead to a disruption in the operation (wear) of the bearing.

The features disclosed in the foregoing description, in the claims that follow, and in the drawings can be relevant individually, as well as in any combination, to the realization of the invention in its various embodiments.

Although some aspects of the present disclosure have been described in the context of a device, it is to be understood that these aspects also represent a description of a corresponding method, so that a block or a component of a device is also understood as a corresponding method step or as a characteristic of a method step. In an analogous manner, aspects which have been described in the context of or as a method step also represent a description of a corresponding block or detail or feature of a corresponding device.

The above-described exemplary embodiments represent only an illustration of the principles of the present invention. It is understood that modifications and variations of the arrangements and details described herein will be clear to other persons of skill in the art. It is therefore intended that the invention be limited only by the scope of the following patent claims, and not by the specific details which have been presented with reference to the description and the explanation of the exemplary embodiments.

REFERENCE NUMBER LIST

100 Bearing assembly
102 Shaft
104 Gap
110 First rolling-element bearing
112 Inner ring of the first rolling-element bearing
114 Running surface of the inner ring of the first rolling-element bearing
116 Rolling elements of the first rolling-element bearing
120 Second rolling-element bearing
122 Inner ring of the second rolling-element bearing
124 Running surface of the inner ring of the second rolling-element bearing
126 Rolling elements of the second rolling-element bearing
132 Contact surface diameter
150 Axial stop
160 Spacer disk
170 Screw
200 Bearing assembly
204 Gap
206 Axial dimension of the gap
218 Guide flange of the first rolling-element bearing
228 Guide flange of the second rolling-element bearing
302 Unloaded state of the shaft
304 Centered loading of the shaft
310 Bearing assembly
320 Shaft
330 Rotating mass
400 Bearing assembly
402 Housing
404 Shaft
406 Attachment flange of the bearing
408 Outer-ring attachment
410 First rolling-element bearing
412 Seal
414 Nut
420 Second rolling-element bearing
440 Spacer disk
504 Shaft
510 Inner ring
512 Guide flange
514 Pressure

We claim:

1. A bearing assembly comprising:
a first rolling-element bearing including an inner ring that is connectable to a shaft for rotation therewith, the inner ring of the first rolling-element bearing having a running surface for rolling elements of the first rolling-element bearing; and
a second rolling-element bearing including an inner ring that is connectable to the shaft for rotation therewith, the inner ring of the second rolling-element bearing having a running surface for rolling elements of the second rolling-element bearing, wherein the inner ring of the first rolling-element bearing and the inner ring of the second rolling-element bearing are configured such that the inner ring of the first rolling-element bearing and the inner ring of the second rolling-element bearing are in contact with each other exclusively radially inward of a contact surface diameter and are spaced axially apart from each other radially outward of the contact surface diameter, the contact surface diameter being smaller than an average value of a maximum diameter of the running surface of the inner ring of the first rolling-element bearing and a maximum outer diameter of the inner ring of the first rolling-element bearing, and the contact surface diameter being smaller than an average value of a maximum diameter of the running surface of the inner ring of the second rolling-element bearing and a maximum outer diameter of the inner ring of the second rolling-element bearing, the inner ring of the first rolling-element bearing and the inner ring of the second rolling-element bearing being disposed directly adjacent to each other, wherein the inner ring of the first rolling-element bearing includes a guide flange which extends radially outward over or beyond the running surface of the inner ring of the first rolling-element bearing, the guide flange being configured to axially limit a movement of the rolling elements of the first rolling-element bearing, and wherein the inner ring of the second rolling-element bearing includes a guide flange which extends radially outward over or beyond the running surface of the inner ring of the second rolling-element bearing, the guide flange of the second rolling-element bearing being configured to axially limit a movement of the rolling elements of the second rolling-element bearing, and wherein the guide flange of the inner ring of the first rolling-element bearing and the guide flange of the inner ring of the second rolling-element bearing are disposed on sides of the inner ring of the first rolling-element bearing and of the second rolling-element bearing, respectively, the sides facing each other axially.

2. The bearing assembly according to claim 1, wherein the inner ring of the first rolling-element bearing and the inner ring of the second rolling-element bearing are configured such that a maximum axial distance between the inner ring of the first rolling-element bearing and the inner ring of the second rolling-element bearing radially outside the contact surface diameter is smaller than a radial dimension of a contact surface between the inner ring of the first rolling-element bearing and the inner ring of the second rolling-element bearing when the inner ring of the first rolling-element bearing and the inner ring of the second rolling-element bearing are disposed directly adjacent to each other.

3. The bearing assembly according to claim 2, wherein the inner ring of the first rolling-element bearing and the inner ring of the second rolling-element bearing are configured such that the maximum axial distance between the inner ring of the first rolling-element bearing and the inner ring of the second rolling-element bearing radially outside the contact surface diameter is smaller than 10% of the radial dimension of the contact surface between the inner ring of the first rolling-element bearing and the inner ring of the second rolling-element bearing when the inner ring of the first rolling-element bearing and the inner ring of the second rolling-element bearing are disposed directly adjacent to each other.

4. The bearing assembly according to claim 3, wherein the inner ring of the first rolling-element bearing and the inner ring of the second rolling-element bearing are configured such that the inner ring of the first rolling-element bearing and the inner ring of the second rolling-element bearing radially outside the contact surface diameter form a V-shaped axial gap or a U-shaped axial gap or a rectangular axial gap when the inner ring of the first rolling-element bearing and the inner ring of the second rolling-element bearing are disposed directly adjacent to each other and wherein the first rolling-element bearing and the second rolling-element bearing are disposed in an X-arrangement.

5. The bearing assembly according to claim 1, wherein the inner ring of the first rolling-element bearing and the inner ring of the second rolling-element bearing are configured such that the inner ring of the first rolling-element bearing and the inner ring of the second rolling-element bearing radially outside the contact surface diameter form a V-shaped axial gap or a U-shaped axial gap or a rectangular axial gap when the inner ring of the first rolling-element bearing and the inner ring of the second rolling-element bearing are disposed directly adjacent to each other.

6. The bearing assembly according to claim 1, wherein the first rolling-element bearing and the second rolling-element bearing are of the same bearing type.

7. The bearing assembly according to claim 1, wherein the first rolling-element bearing and the second rolling-element bearing are tapered roller bearings.

8. The bearing assembly according to claim 7, wherein the first rolling-element bearing and the second rolling-element bearing are disposed in an X-arrangement.

9. The bearing assembly according to claim 1, wherein the first rolling-element bearing and the second rolling-element bearing are symmetric to each other in the axial direction.

10. A wind turbine including a bearing assembly according to claim 1.

11. A bearing assembly, comprising:
a first rolling-element bearing comprising a first plurality of rolling elements and first inner ring having an axial end and defining a running surface along which the first plurality of rolling elements are configured to roll; and
a second rolling-element bearing comprising a second plurality of rolling elements and a second inner ring having an axial end and a running surface along which the second plurality of rolling elements are configured to roll,
wherein the axial end of the first inner ring contacts the axial end of the second inner ring radially inward from a contact surface diameter, and wherein the axial end of the first inner ring is spaced axially apart from the axial end of the second inner ring radially outward of the contact surface diameter, and
wherein the contact surface diameter is smaller than an average value of a maximum diameter of the running surface of the first inner ring and a maximum outer diameter of the first inner ring, and the contact surface diameter is smaller than an average value of a maximum diameter of the running surface of the second inner ring and a maximum outer diameter of the second inner ring.

12. The bearing assembly of claim 11, wherein:
the first inner ring further comprises a first guide flange at the axial end of the first inner ring, the first guide flange extending radially outward of the running surface of the first inner ring;
the second inner ring further comprises a second guide flange at the axial end of the second inner ring, the second guide flange extending radially outward of the running surface of the second inner ring; and the first and second guide flanges are in contact radially inward of the contact surface diameter, and are spaced axially apart radially outward of the contact surface diameter.

13. The bearing assembly of claim 11, wherein the axial end of the first inner ring and the axial end of the second inner ring define an axial gap therebetween, radially outward of the contact surface diameter.

14. The bearing assembly of claim 13, wherein the axial gap has a cross-sectional shape selected from the group consisting of: a V-shape, a U-shape, and a rectangular shape.

* * * * *